US012164958B2

(12) United States Patent
Goudie et al.

(10) Patent No.: US 12,164,958 B2
(45) Date of Patent: *Dec. 10, 2024

(54) BUILDING AND SCHEDULING TASKS FOR PARALLEL PROCESSING

(71) Applicant: Imagination Technologies Limited, Kings Langley (GB)

(72) Inventors: Alistair Goudie, Hertfordshire (GB); Panagiotis Velentzas, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,999

(22) Filed: Apr. 11, 2023

(65) Prior Publication Data

US 2023/0297422 A1    Sep. 21, 2023

Related U.S. Application Data

(63) Continuation of application No. 17/491,242, filed on Sep. 30, 2021, now Pat. No. 11,640,318.

(30) Foreign Application Priority Data

Sep. 30, 2020  (GR) .............................. 20200100595
Nov. 13, 2020  (GB) ..................................... 2017885

(51) Int. Cl.
*G06F 9/48*     (2006.01)
*G06F 12/0802*  (2016.01)

(52) U.S. Cl.
CPC ........ *G06F 9/4881* (2013.01); *G06F 12/0802* (2013.01); *G06F 2212/60* (2013.01)

(58) Field of Classification Search
CPC . G06F 9/4881; G06F 12/0802; G06F 2212/60
See application file for complete search history.

(56) References Cited

U.S. PATENT DOCUMENTS

2009/0262132 A1   10/2009  Peterson et al.
2012/0139926 A1   6/2012   Clohset et al.
(Continued)

FOREIGN PATENT DOCUMENTS

EP    3349179 A1    7/2018
EP    3588289 A2    1/2020
(Continued)

OTHER PUBLICATIONS

Anonymous; "Data structures for tile-based (deferred) rendering"; Retrieved from the Internet: URL:https://computergraphics.stackexchange.com/questions/38/data-structures-for-tile-based-deferred-rendering; Aug. 5, 2015; 2 pages.
(Continued)

*Primary Examiner* — Wissam Rashid
(74) *Attorney, Agent, or Firm* — Potomac Law Group, PLLC; Vincent M DeLuca

(57) ABSTRACT

Logic includes a task builder for building tasks comprising data items, a task scheduler for scheduling tasks for processing by a parallel processor, a data store arranged to map content of each data item to an item ID, and a linked-list RAM comprising an entry for each item ID. For each new data item, the task builder creates a new task by starting a new linked list, or adds the data item to an existing linked list. In each linked list, the entry for each data item records a pointer to a next item ID in the list. The task builder indicates when any of the tasks is ready for scheduling. The task scheduler identifies a ready task based on the indication from the task builder, and in response follows the pointers in the respective linked list in order to schedule the data items of the task for processing.

19 Claims, 7 Drawing Sheets

(56) References Cited

U.S. PATENT DOCUMENTS

| | | |
|---|---|---|
| 2012/0254497 A1 | 10/2012 | Yang et al. |
| 2014/0109102 A1 | 4/2014 | Duncan et al. |
| 2015/0325037 A1 | 11/2015 | Lentz et al. |
| 2016/0063753 A1 | 3/2016 | Peterson et al. |
| 2017/0256020 A1 | 9/2017 | Sansottera et al. |
| 2020/0184715 A1 | 6/2020 | Goswami et al. |
| 2020/0265546 A1 | 8/2020 | Howson et al. |

FOREIGN PATENT DOCUMENTS

| | | |
|---|---|---|
| GB | 2579111 A | 6/2020 |
| WO | 0010372 A2 | 3/2000 |
| WO | 2020015808 A1 | 1/2020 |

OTHER PUBLICATIONS

Sommefeldt; "A look at the PowerVR graphics architecture: Tile-based rendering"; Retrieved from the Internet: URL:https://www.imgtec.com/blog/a-look-at-the-powervr-graphics•-architecture-tile-based-rendering/; Apr. 2, 2015; pp. 1-10.

Orr et al, "Fine-grain task aggregation and coordination on GPUs,"ACM SIGARCH Computer Architecture News, vol. 42, 2014, pp. 181-192.

Sanchez et al, "Dynamic Fine-Grain Scheduling of Pipeline Parallelism," Parallel Architectures and Compilation Techniques (PACT), 2011, pp. 22-32.

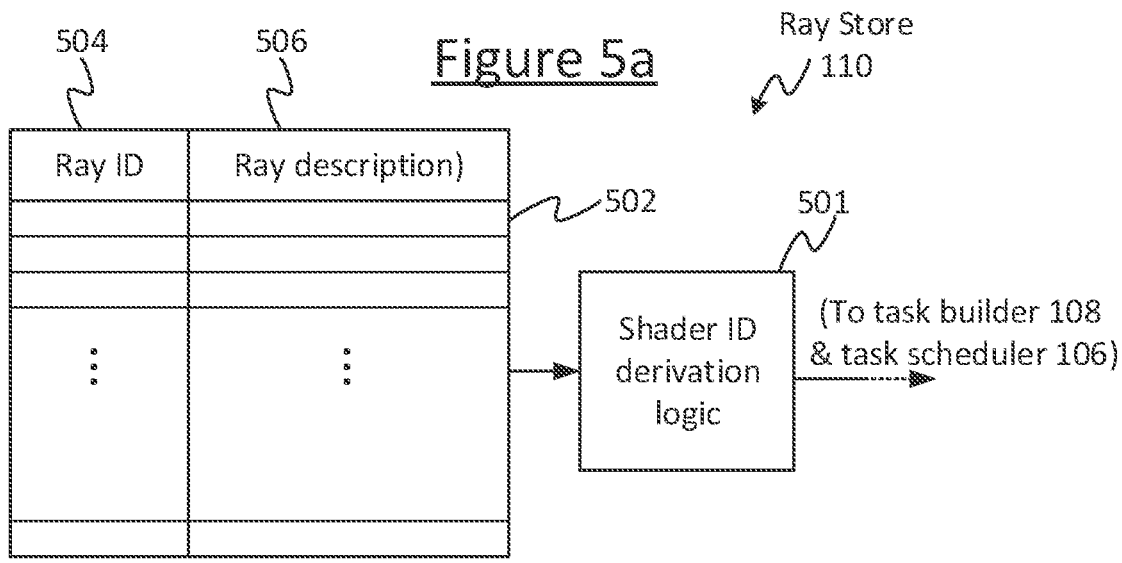
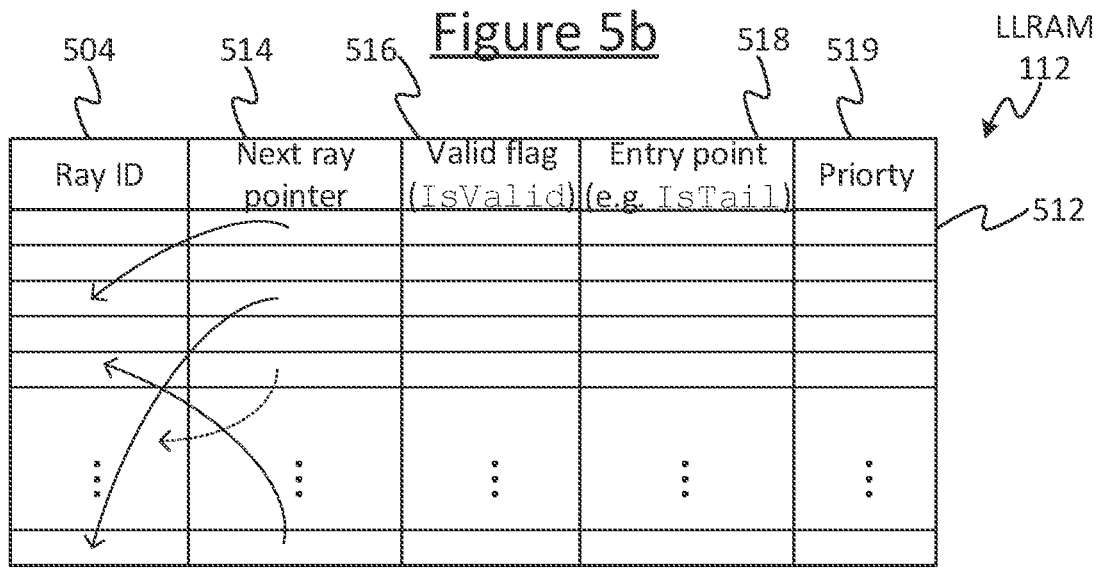
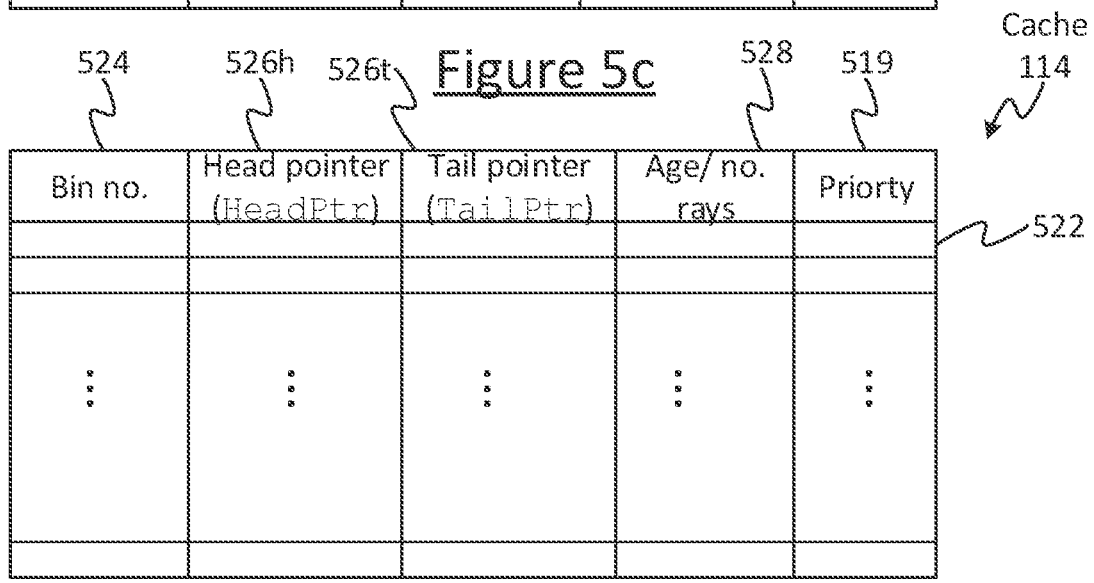

Figure 6

Cache 114

| Set no. | Tag | Way no. | Head pointer (HeadPtr) 526h | Tail pointer (TailPtr) 526t | Age/ no. rays 528 | priorty 519 |
|---|---|---|---|---|---|---|
| 0 | | 0 | 522 | | | |
| 602 | | 1 | 522 | | | |
| | | 2 | ⋮ | | | |
| | | 3 | | | | |
| 1 | | 0 | | | | |
| 602 | | 1 | | | | |
| | | 2 | | | | |
| | | 3 | | | | |
| 2 | | 0 | | | | |
| 602 ⋮ | | ⋮ | | | | |

BUILDING AND SCHEDULING TASKS FOR PARALLEL PROCESSING

CROSS REFERENCE TO RELATED APPLICATIONS AND CLAIM OF PRIORITY

This application is a continuation under 35 U.S.C. 120 of copending Application Ser. No. 17/491,242 filed Sep. 30, 2021, now U.S. Pat. No. 11,640,318, which claims foreign priority under 35 U.S.C. 119 from Greece application Ser. No. 20200100595 filed Sep. 30, 2020, and United Kingdom Application No. 2017885.1 filed Nov. 13, 2020, the contents of which are incorporated herein by reference.

BACKGROUND

A processor is a device for executing machine code instructions. A given processor is configured to recognize a certain predefined set of instruction types, referred to as the instruction set of the processor. Each instruction type is defined by a respective opcode and zero or more operand fields. The processor is configured to fetch instructions from memory for execution. The processor may comprise a number of different kinds of sub unit for preforming different categories of operations, depending on the type of the instruction being executed. E.g. the processor may comprise an integer arithmetic logic unit for performing integer arithmetic operations in response to arithmetic instruction types, a floating point arithmetic logic unit for performing floating point operations in response to floating point instruction types, and a load-store unit for performing memory access operations in response to load and store instruction types.

For instance, in a reduced instruction set computer (RISC), a load instruction takes at least two operands: a source memory address and an identifier specifying a destination register in a register file of the processor. When executed, the load instruction acts on the load-store unit to load a value from the source address into the destination register. Logic instructions may take different numbers of operands depending on the type of instruction. E.g. a logic instruction such as an add or multiply instruction, etc., may take three operands: two specifying two respective source registers in the register file, and one specifying a destination register in the register file. When executed the logic instruction acts on the relevant logic unit, such as an integer or floating point arithmetic logic unit, in order to perform the relevant logic operation on the values in the specified source registers, and place the result in the specified destination register. The operation to be performed, and which logic unit is triggered to perform this operation, will depend on the opcode of the instruction in question. To store the result of a logic operation back to memory involves a store instruction. A store instruction takes at least two operands: one specifying a source register in the register file and one a destination address in memory. When executed the store instruction acts on the load-store unit to store the value in the specified source register to the destination memory address.

One way in which an application-specific processor, such as a graphics processing unit (GPU), can be tailored to a specific application, is to include one or more specialised instruction types in the instruction set of the processor. Such an instruction type will perform a more complex operation than a simple load, store, add or multiply, etc., triggered in response to a single instance of a single machine code instruction of the type in question. E.g. this could be a particular mathematical operation, such as a multiply-accumulate (MAC), that comes up frequently in the application in question. The same operation could be built from a combination of general purpose add and multiply instructions, or the like, but that would reduce the code density compared to using instructions of a more specialised instruction set.

In some kinds of processor, such as a vector processor, SIMD (single instruction multiple data) or SIMT (single instruction multiple thread) processor, the processor comprises multiple parallel processing channels (e.g. SIMD lanes). Each of the parallel processing channels may comprise a respective instance of at least one of the same kind of logic unit. For example, each channel may comprise a respective arithmetic logic unit (ALU) such as an integer arithmetic logic unit or floating point arithmetic logic unit. In response to execution of the same instance of the same instruction, fetched in a single fetch operation, some or all of the logic units in the different parallel channels are triggered to perform the same operation on different data, e.g. on different elements of a vector in a vector register specified as the source of the operation. For example, each ALU may be operable to perform a multiply-accumulate (MAC), also known as a multiply-add. This takes two multiplication inputs (sometimes referred to as the multiplier and multiplicand) and an addend input (also known as the accumulator), and adds the addend to the product of the two multiplication inputs. The MAC may be implemented as a fused-multiply add whereby the multiply-accumulate is performed in one fused step. The result of the MAC by each parallel logic unit may be placed in a respective element of a destination vector register.

To take advantage of parallel processing resources, it can be desirable to group together data to be processed into tasks, where the data of a given task can be processed in parallel by the same program, and different tasks are to be processed by different programs.

An example occurs in ray tracing. Ray tracing refers to a graphics processing technique for generating an image by tracing a path of light through a modelled environment and simulating the effects of its encounters with objects along the way. Modelled rays of light are traced from a modelled source to a modelled view point (forward ray tracing) or vice versa backwards from the modelled view point to the modelled source (i.e. reverse ray tracing, which is typically more efficient as forward ray tracing often results in processing rays whose trajectory ultimately never hits the viewpoint). A ray may be described by coordinates of an origin of the ray, a vector specifying the direction of the ray, a maximum and minimum extent of the ray along that vector, and optionally a ray colour. Ray tracing begins by casting rays out into the modelled environment, from each pixel in the image in the case of reverse ray tracing. Objects with which rays may interact in the modelled environment are divided into geometric primitives, e.g. triangular facets. For each ray, the ray tracing comprises finding the closest geometric primitive (if any) with which the ray interacts.

In some graphics processors this search is performed in fixed function hardware. When an incident ray intersects it can then either terminate, reflect or refract. A reflection or refraction introduces one or more secondary rays with a new direction relative to the incident ray, which is terminated (i.e. the reflected or refracted ray is modelled as a new ray). The secondary rays may also accumulate a new value (colour) relative to the incident ray.

Determining the effect of an interaction of a ray with a geometric primitive is typically solved analytically in software. The program that does this is called a shader program.

There are typically different shader programs that are run to handle different interaction scenarios.

For example, the different shader programs could comprise: a miss shader program, a closest-hit shader program, an any-hit shader program, and an intersection shader program. The miss shader program is run when ray does not hit anything. The closest-hit shader program is run when a ray hits a geometry where it is known that this hit is going to be kept and the program is required to calculate the effects of light at the hit point. The any-hit shader program is run when a ray hits a geometry but the program is also required to decide whether to keep the hit or not. The closest-hit shader program will be run afterwards if the hit is kept. The intersection shader program is run when a ray hits a box with user-defined geometry in it and the program is required to procedurally generate or load up from memory that geometry, check which of these geometries are hit by the ray and then decide whether keep that hit. The closest-hit program will be run afterwards if the hit is kept. The above is a classification derived from the ray tracing API standards. In one implementation the any-hit and intersection shaders may be grouped together into a traverse shader.

In general the operations done to support ray-tracing are: ray generation (spawn a ray), ray intersection (test a ray against a primitive or a box containing primitives), ray traversal (search a tree of aforementioned boxes or other such scene acceleration structure, and schedule intersections along the walk of the tree).

To exploit the availability of parallel processing resources such as parallel SIMD lanes in a SIMD processor, different rays to be processed may be grouped together into tasks, where a given task may comprise multiple rays which are to be processed by the same shader program, and different tasks are processed by different shader programs. It is desirable to group together, into a task, rays that are going to be processed by the same shader program (where "ray" in this context refers to data representing an optical ray). This process is referred to as coherency gathering. The execution of the shader program may be invoked by the intersection of a ray or something else. Note also that it is not necessarily just the ray that is processed by the shader program, but in embodiments also other factors associated with the ray.

Sometimes this may comprise grouping rays that are to be processed by the same the same shader program and same primitive geometric primitive. For example in the case of different rays hitting the same box or node of an acceleration structure, the shader will need to schedule intersection tests for all the rays against all the children of that box or tree-node (though in other implementations this may be done in fixed function hardware).

The module of the processor that groups together rays into tasks may be referred to as the task builder. The module that takes tasks built by the task builder and schedules them for processing may be referred to as the task scheduler. In some processors these may be implemented in fixed function hardware.

There is a trade-off to be made when grouping rays into tasks. On the one hand it would be desirable to group together rays into the maximum number that can be processed in parallel by the parallel processor. E.g. if a SIMD processing unit has 512 parallel SIMD lanes, it would be desirable to group together 512 rays to be processed in parallel with one another. On the other hand it is also desirable to keep the processor busy with work, so if a full-size group cannot be assembled quickly enough to keep the processor busy, it may be desirable to schedule a smaller group for execution. Another downside of large tasks is that their data (e.g. rays) tend to diverge more. This is due to branch divergence where different instances of data follow different execution paths through the code. In simple terms, if at least one instance follows a branch then all instances have to go through it. The coerced instances (those executed through a branch they would not have been otherwise) execute the branch's instruction but those instruction do not have an effect on their state. There is also the silicon footprint of the coherence gathering mechanism to consider.

SUMMARY

Another potential source of stalls is in the interface between task builder (producer) and task scheduler (consumer). In a prior known mechanism, tasks built by the task builder are queued in a first-in, first-out (FIFO) buffer, waiting to be scheduled by the task scheduler. However if the task builder is producing tasks more quickly than the task scheduler can consume them, then the FIFO may become full and thus stall the task builder. This could even cause stalls further back up the pipeline. To include enough buffering capability to avoid this would be very expensive in terms of silicon footprint. It would therefore be desirable to provide an alternative interface between the task builder and task scheduler.

According to one aspect disclosed herein, there is provided logic comprising: a task builder for building a plurality of tasks, each comprising a respective group of data items to be processed by a respective program; a task scheduler for scheduling each of the tasks to be processed by the respective program run on a parallel processing subsystem, whereby for each task, at least some of the data items of the respective group are processed in parallel; a data store arranged to hold, at least temporarily, respective data content for each of the data items mapped to a respective item ID; and a linked-list RAM comprising a respective entry for each of the item IDs. The task builder is configured to build the tasks by, when a new data item is received into the data store, determining whether an existing task exists for the new data item, and a) if not creating a new task by starting a new respective linked list in the linked-list RAM comprising the new data item, but b) if so, adding the new data item to an existing respective linked list in the linked-list RAM, wherein in each linked list, the entry for each data item in the list from a head data item to at least a last before a tail data item records a pointer to a next item ID in the linked list. The task builder is further configured to indicate when any of the tasks is ready for scheduling; and the task scheduler is arranged to identify a task ready for scheduling based on the indication from the task builder, and in response to follow the pointers in the respective linked list in order to schedule the data items of the respective task for the processing by the parallel processing subsystem.

By using a linked list, this provides a disjoint between the task builder (producer) and task scheduler (consumer), enabling the task scheduler to run independently from the task builder and thus mitigating the issue of stalling at this interface. Because the linked-list RAM has an individual respective entry dedicated to each possible ray in the ray store, then with only a relatively small amount of silicon, this enables any possible combination of grouping of rays into tasks to be accommodated without the possibility of a stall between task builder and task scheduler. In the ray tracing application for example, all the rays in the system can theoretically finish traversal and be stitched in the linked-list without the scheduler needing to consume any of that data until it is ready to do so.

For completeness, note that it is not excluded that some other tasks, other than said plurality, could consist of only a single data item. In that case the head and tail data item in the linked-list RAM are the same.

In embodiments, the task builder may be configured to perform said indicating by asserting a respective flag in the linked-list RAM to flag when any of the tasks is ready for scheduling; and the task scheduler may be arranged to perform said identifying by monitoring the linked-list RAM for asserted flags, and to detect that one of the tasks is ready when the respective flag is asserted.

In embodiments, the task builder may comprise temporary storage arranged to store one or more indications of tasks being built, and the task builder may be further configured to remove the indication of a selected task from the temporary storage based on one or more predetermined criteria and indicate that the selected task is ready for scheduling.

In embodiments, the temporary storage may comprise a cache comprising a plurality of bins, each operable to cache one of the tasks by temporarily recording an indication of the task, wherein when a new task is created it is cached in one of the bins, wherein the predetermined criteria may comprise an eviction policy and the cache may be configured to evict tasks from the bins according to the eviction policy, and wherein the task builder may be configured to indicate that the selected task is ready for scheduling when the selected task is evicted from the cache.

In any embodiment, the logic may be embodied in hardware on an integrated circuit.

There may be provided a method of manufacturing, at an integrated circuit manufacturing system, a processor comprising said logic. There may be provided an integrated circuit definition dataset that, when processed in an integrated circuit manufacturing system, configures the system to manufacture the logic or processor. There may be provided a non-transitory computer readable storage medium having stored thereon a computer readable description of the logic or processor that, when processed in an integrated circuit manufacturing system, causes the integrated circuit manufacturing system to manufacture an integrated circuit embodying the logic or processor.

There may be provided an integrated circuit manufacturing system comprising: a non-transitory computer readable storage medium having stored thereon a computer readable description of the logic or processor; a layout processing system configured to process the computer readable description so as to generate a circuit layout description of an integrated circuit embodying the logic or processor; and an integrated circuit generation system configured to manufacture the logic or processor according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

BRIEF DESCRIPTION OF THE DRAWINGS

Examples will now be described in detail with reference to the accompanying drawings in which:

FIGS. 5a-5c schematically illustrate example fields of a ray store, linked-list RAM and task cache according to embodiments of the present disclosure;

FIG. 6 schematically illustrates further example fields of a task cache according to embodiments disclosed herein;

Figure 1:
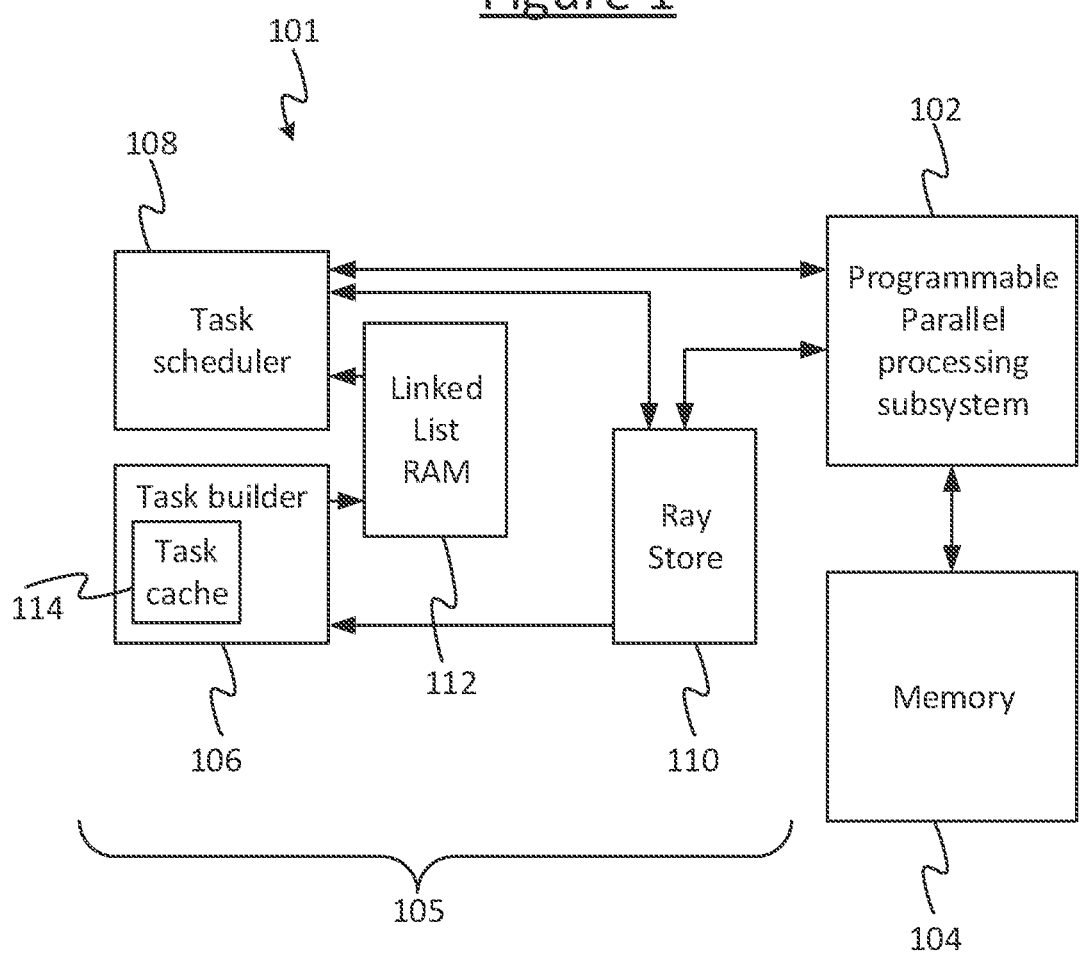
FIG. 1 is a schematic block diagram of a processor according to embodiments of the present disclosure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Often a cache is used to gather coherence amongst rays that hit the same surface, or different surfaces that use the same shader, and for which the same shader is to be scheduled. E.g. sometimes objects of the same material have the same shader or set of shaders. Work is generated for scheduling when a cache line gets evicted due to a collision or other reasons. If the scheduler is unable to process that work then the cache is stalled and cannot process any incoming lookup commands. The stalling can propagate upstream affecting other logical units responsible for traversing the acceleration structure for example.

A previous solution was trying to deal with the problem of stalling by laying down significant amount of buffering to minimize the chance of this happening.

Embodiments disclosed herein use a cache to gather coherence amongst rays for which the same shader is to be scheduled. The cache builds linked lists of rays using a local ray array. A hit adds the ray to the linked-list associated with a particular shader. After a cache line eviction its linked-list is terminated and the entry-point ray to it is flagged in the ray-array. Concurrently and independently a scheduler scans through the ray-array in search of rays flagged as entry-points to completed linked-lists. Selected linked-lists are walked in order to read out their rays and schedule them. When a linked-list is fully walked the entry-point ray flag is cleared to signal that the linked-list has been dismantled. In some particular embodiments, a ray can only arrive back to the coherence gatherer after it has been scheduled, and a ray sideband incoming to coherency gathering is not propagated through the ray-array and needs to be obtained again by the scheduler. In practice the scheduler may read the sideband information of just one of the rays in the task, because that information is the same across all the rays of the task and as such it is task specific.

FIG. 1 is a schematic block diagram of a processor 101 according to embodiments of the present disclosure. The processor 101 comprises a parallel processing subsystem 102, memory 104 and coherency gathering logic 105.

The memory 104 may comprise one or more memory units, e.g. a separate program memory and data memory. In embodiments the memory 104 is internal to the processor 101 (same chip, i.e. same die). However some or all of the memory 104 could instead be external to the processor 101 (either off-chip but in the same IC package, or external to the IC package). The memory 104 may employ one or more memory media, e.g. an electronic medium such as an EPROM, EEPROM, flash memory, or static or dynamic RAM, etc.; or one or more magnetic media such as a magnetic disk or tape; or an optical medium such as an optical disk.

The parallel processing subsystem 102 comprises one or more constituent processing units, each comprising a plurality of parallel processing channels, e.g. SIMD lanes. For example in some embodiments the parallel processing subsystem 102 may comprise two SIMD processing units, each comprising multiple SIMD lanes, e.g. 128 lanes per SIMD unit. In embodiments one or more of the processing unit(s) may also be multi-threaded, i.e. a barrel-threaded unit able to temporally interleave a plurality of concurrent threads through each lane. E.g. in some embodiments each SIMD unit is able to interleave up to 48 threads through each of the 128 SIMD lanes. Embodiments herein may be described in terms of the parallel processing subsystem 102 being a SIMD subsystem comprising one or more SIMD units. However, more generally in any embodiment below, the SIMD unit(s) may be replaced by any form of parallel processor unit such as a vector processing units or SIMT unit. For the present purposes, "parallel processing" refers to data-level parallelism, i.e. the ability of different parallel channels (e.g. lanes) of a given processing unit to execute an instruction fetched from memory 104 in the same instruction fetch on different items of data (which may also be called data "instances").

The coherency gathering logic 105 is coupled to the parallel processing subsystem 102, and is configured to gather together different data instances (i.e. different data items) that are to be processed (i.e. operated upon) by the same program so that they can be scheduled as a batch to be processed in parallel though different parallel lanes of the parallel processing subsystem 102. I.e. the data instances are gathered together into batches, where the instances of a given batch are to be processed by the same program run on the parallel processing subsystem 102, and at least some different tasks are to be processed by different respective programs. A batch of data instances may be referred to herein as a "task", where work is to be performed on a respective task by a respective program. The coherency gathering logic 105 comprises: a task builder 106, a task scheduler 108, a data store 110 (e.g. a ray store), and a linked-list RAM 112. In embodiments the processor 102 is a GPU, and each of the data instances may represent a respective ray of a ray-tracing application. In this case the program that processes a given task (batch of rays) may be referred to as a shader program, and the data store 110 as a ray store.

By way of illustration the following embodiments will be described in terms of such examples, but in any embodiment, more generally the GPU 102 could be any type of processor with parallel processing capabilities, and the rays could be replaced with any data instances (i.e. any items of data) which are to be gathered together into batches for parallel processing by any type of program. Another example would be pixels covered by same primitive or primitives with same pixel shader in rasterization.

The linked-list RAM is operatively coupled to both the task builder 106 and the task scheduler 108. The ray store 110 is operatively coupled to the task builder 106 and the parallel processing subsystem 102, and may also be operatively coupled to the task scheduler 108.

An example of the ray store 110 is shown in FIG. 5a. The ray store 110 comprises a plurality of ray-store entries 502, each comprising a ray ID (or more generally item ID or instance ID) 504 mapped to a respective ray description field 506 for holding the ray description of a respective ray (or more generally the data of a respective data item, or "instance"). The ray IDs 504 are the addresses of the ray store 110, so the ray store 110 is addressable by ray ID. The ray IDs are represented schematically as a column in FIG. 5a for illustrative purposes, but it will be appreciated that the ray ID is not a stored value stored in the entry 512 per se, but rather is comprised by a selectable combination of gates in the addressing circuitry of the ray store 110, which, when selected, map to the values stored in the fields (e.g. 506) of the entry 512. By way of illustration, in one implementation there may be of the order of 8192 (=2^13) addresses in the ray store. At any given time the entries of some addresses may be occupied with ray descriptions and some not. Each ray description 506 comprises information about the respective ray, such as the coordinates of its origin, a vector describing is direction, its maximum and/or minimum extent, and/or an indication of the closest geometric primitive with which the ray has intersected up to now within the modelled environment.

In operation, new rays to be processed are received into the ray store 110 ("ray" in this context refers to the data instance or item representing a ray). In embodiments these are received directly or indirectly from an application running on a host processor (not shown in FIG. 1). For example they may be received from software running on the parallel processing subsystem 102 operating under control of the host processor (e.g. via a command engine 206, see later). Alternatively it is not excluded that the rays could be generated autonomously by the parallel processing subsystem 102, or could be received from another processing module either internal or external to the processor 101. The task builder 106 is arranged to detect new rays that arrive in the ray store 110 and group them into tasks (i.e. batches) which are recorded in the linked-list RAM 112 in the form of linked lists, each linked-list recording a different one of the tasks. An example of the linked-list RAM 112 is shown in FIG. 5b, to be discussed in more detail later. When a task is ready for scheduling, the task builder 106 marks it as such in the linked-list RAM 112. The task scheduler 108 detects this and schedules the rays of the task in question for parallel processing with one another through the parallel processing subsystem 102.

More generally, the functionality of the linked list RAM could be spread across one or more storage modules. For example, indicating that a task is ready could comprise sending a signal (e.g. comprising an identifier of the task, such as a ray ID from the task) to the task scheduler 108, where the task scheduler on receiving such a signal stores the flag indicating the task is ready somewhere else (such as in storage local to the task scheduler). In a further example, instead of storing flags to indicate tasks ready for scheduling, a separate list of ready tasks may be maintained, e.g. in the form of a table indicating which tasks (identified by a corresponding ray ID) are ready.

Figure 2:
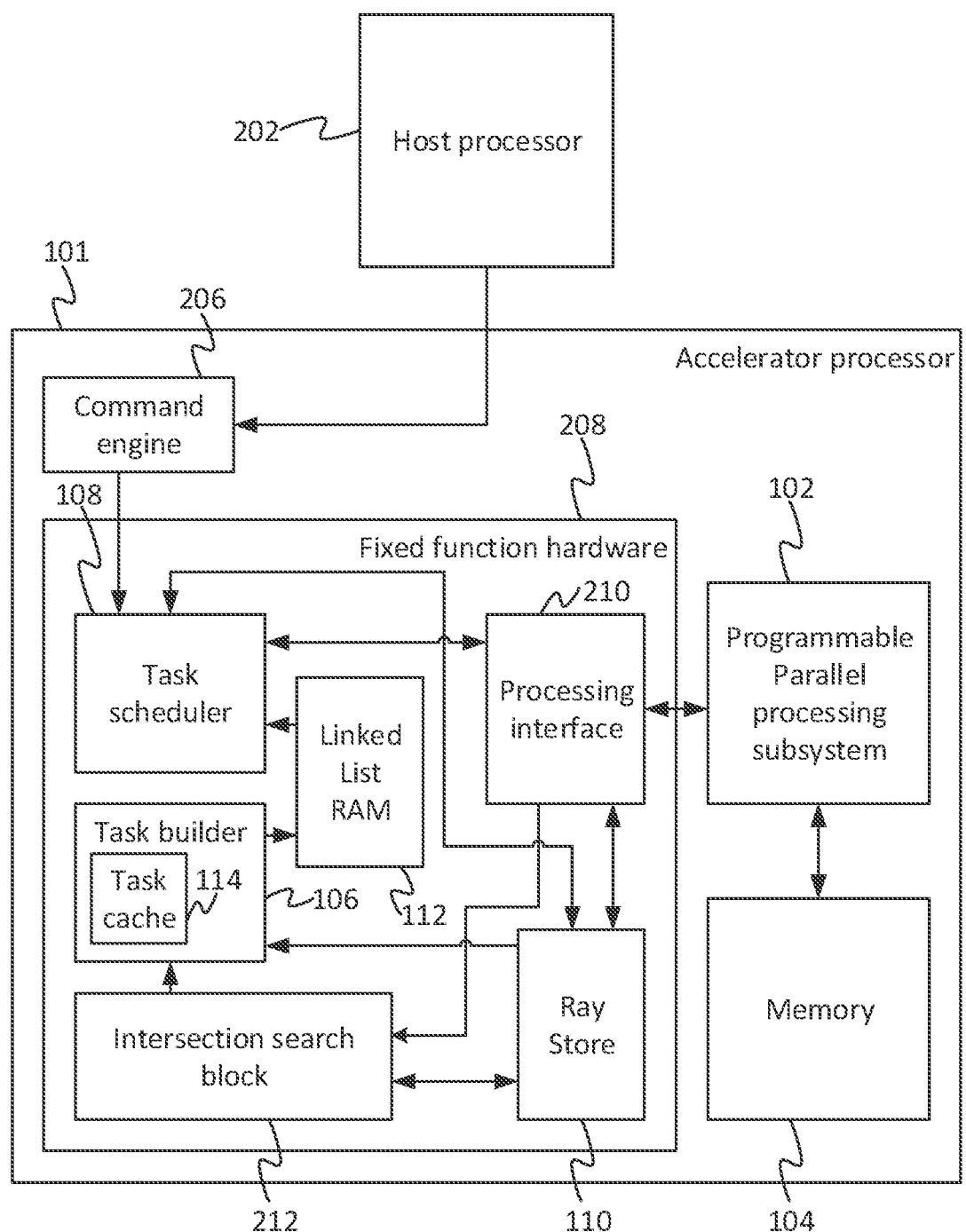
FIG. 2 is a schematic block diagram of a graphics processor according to embodiments of the present disclosure.

FIG. 2 illustrates in more detail a particular example implementation of the processor 101 of FIG. 1. However it will be appreciated that this is only given by way of example and is not limiting. In FIG. 2, the processor 101 is arranged as an accelerator to a host processor 202. In addition to the components described in relation to FIG. 1, the accelerator processor 101 further comprises a command engine 206, and intersection search block (e.g. hierarchy search block) 212, and a processing interface 210. Each of these along with the task builder 106, task scheduler 108, ray store 110 and linked-list RAM 112 is implemented in fixed function hardware 208. The task scheduler 108, ray store 110 and intersection search block 212 are operatively coupled to the parallel processing subsystem 102 via the processing interface 210. The processor 101 is operatively coupled to the host processor 202 via the ray command engine 206.

In operation, software running on the parallel processing subsystem 102 will initialise a new ray and then initiates intersection search block 212 to process the ray. In embodiments, the structure searched is hierarchical, e.g. a hierarchical structure of boxes in the modelled space (boxes reference boxes which reference boxes and so on). Intersection detection (i.e. analytically determining the intersection of two objects like a ray vs. a box for example) is an activity performed repeatedly while searching/traversing the hierarchy. More generally the intersection search could use any acceleration structure search or geometrical database search, for example.

The output of the intersection search block 212 is a ray which needs to schedule a new shader. The task builder 106 will group rays which need to run the same shader into tasks.

For example, the task scheduler 108 takes input from the host processor 202 via the ray command engine 206 and then runs a different shader program on the processing subsystem 102. The input specifies one or more new rays to be processed by the processor 101. That shader program running on the processing subsystem 102 then writes the new rays to the ray store 110 through the interface 210. The shader program then initiates a search to be performed by the intersection search block 212 (in fixed function hardware) to determine which is the closest geometric primitive (e.g. triangular facet) with which the ray intersects. In particular embodiments this search may comprises a hierarchical search iteration, which comprises a series of tests against an 'acceleration structure' to find the closest geometry intersection along a ray. At the end of the search, the search block 212 stores the information about the closest intersection in the ray description for the relevant ray in the ray store 110, and also sends a signal to the task builder 106 to alert it to the new ray for which the intersection search has been finished (in this particular embodiment, this is how the task builder 106 detects the new ray). The task builder 106 then determines whether to add the new ray to an existing task or start a new task. Once a task is ready for scheduling the task builder 106 sets a flag against the relevant linked-list in the linked-list RAM 112. This flag is detected by the task scheduler 108, and the task scheduler 108 then proceeds to schedule the task for processing by the processing subsystem 102.

The features described below may apply to the processor 101 of FIG. 2 or the more general case of FIG. 1.

Figure 3:
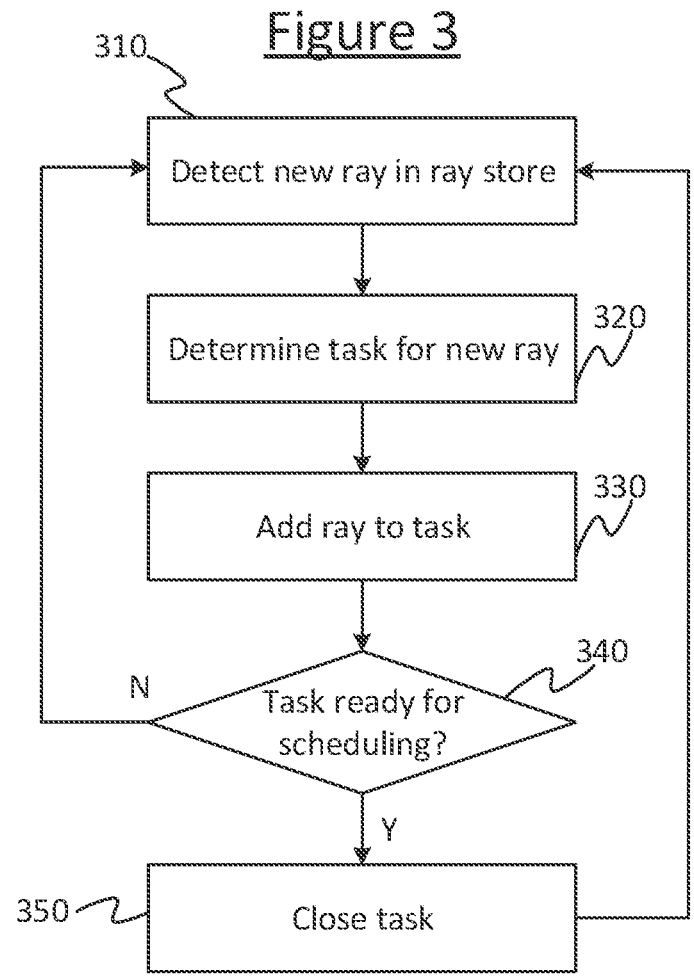
FIG. 3 is a flow chart of a method performed by a task builder according to embodiments of the present disclosure.

The task builder 106 may be configured so as, in operation, to perform a method as set out in FIG. 3. The task scheduler 108 may be configured so as, in operation, to perform a method as set out in FIG. 4.

In embodiments the task builder 106 and task scheduler 108 are implemented in fixed function hardware, i.e. dedicated circuitry. However, it is not excluded that some or all of the function of the task builder 106 and/or task scheduler 108 could instead be implemented in software, either run on the processing subsystem 102 of the processor 101, or the host processor (e.g. 202), or another processing module either internal or external to the processor 101.

FIG. 3 shows the method of the task builder 106. At step 310 the task builder 106 detects a new ray that has been received into the ray store 110, e.g. from the host processor 202. In embodiments it detects this by receiving a signal from the intersection search block 212 alerting it that an intersection search has been completed for the new ray and thus the ray is available to be included in a task. Alternatively, in other embodiments, the signal alerting the task builder 106 to the new ray could come from elsewhere, or the task builder 106 could be configured to detect new rays by monitoring the ray store 110 for newly occupied entries.

By whatever means the new ray is detected, then at step 320 the task builder 106 determines which task to add the new ray to. This could be an existing task or a new task. In embodiments, this determination may be based on the corresponding ray description 506 for the new ray in the ray store 110. In some such embodiments, the ray store 110 comprises shader ID derivation logic 501 which is configured to automatically derive a shader ID from the respective ray description 506 for each new ray added to the ray store 110. Alternatively this logic could be implemented in the task builder 106 itself. Another option would be to store the shader ID for each ray in the respective ray description in the ray store 110.

The shader ID is the ID of a respective shader program for processing rays. Thus each ray is mapped to a certain shader ID. The mapping of rays to shader IDs is many-to-one, such that the multiple rays map to the same shader ID. For instance rays that intersect with the same geometric primitive may be processed by the same shader ID. The derivation could also be more complex than this. For instance in one implementation rays are grouped based on (e.g. the cache tag is generated based on): shader ID, shader type (e.g. closest-hit etc as discussed in the background) and which SIMD engine (if there are multiple) generated the primary ray that is the original ancestor of this ray.

Tasks are recorded as linked-lists in the linked-list RAM 112. If the shader ID for the new ray is the same as the shader ID of an existing task in the linked-list RAM 112, then the task builder 106 adds the new ray to that task. If however there is not already a task for this shader ID in the linked-list RAM 112, then the task builder 106 starts a new task in the linked-lists RAM.

FIG. 5b shows an example implementation of the linked-list RAM 112. The linked-list RAM 112 comprises a plurality of list entries 512, one for each entry 502 in the ray store 110, and thus one for each ray ID 504 in the ray store (the linked-list RAM 112 has the same depth as the ray store 110, e.g. 8192 entries). Each list entry 512 comprises at least a ray ID 504 and a corresponding pointer field (the next ray pointer) 514. Like the ray store 110, the linked-list RAM 112 is addressable by ray ID 504. Like FIG. 5a, the ray IDs are represented schematically as a column in FIG. 5b for illustrative purposes, but it will be appreciated that the ray ID is not a stored value stored in the entry 512 per se, but rather is comprised by a selectable combination of gates in the addressing circuitry of the linked-list RAM 112. The pointer field 514 is operable to hold a respective next ray pointer mapped to the respective ray ID 504. The next ray pointer is the ID of another ray in the linked-list RAM 112. Thus, the linked-list RAM 112 enables the creation of linked-lists by, for at least each but the last ray in a given list, recording against that ray in its pointer field the ID of the next ray in the list. The pointer field 514 of the last ray in the list (the tail) may point to itself, or may comprise a null value, or in some embodiments may point back to the head of the list (in which case the task builder 106 sets the next ray pointer of the tail when the task becomes ready for scheduling). The chain of rays in the list points from head to tail. In embodiments the head is the most recently added ray and the tail is the oldest, but in alternative implementations this could be implemented the other way around. The members of a linked-list (and therefore the members of the task represented by that linked list) can then be determined by following the pointers from one ray to the next in the linked-list RAM 112. This process may be referred to as walking the list. The walk may start from the head, or may start from the tail or anywhere in between if the tail points back to the head (i.e. circular linked-list embodiments).

The linked-list RAM 112 also comprises a mechanism for marking the linked list of a task as ready for scheduling. In embodiments this is implemented by means of a separate valid flag (e.g. IsValid) 516 included in each entry 512 in the linked list RAM, such that when this flag is asserted, it indicates that the task of the linked-list including that list entry is ready for scheduling. The flag may be a single bit, but it is not excluded that it could instead consist of more than one bit.

In embodiments, each entry 512 in the linked-list RAM may also comprise a respective entry point field 518 for marking the entry as an entry point for walking the list of which forms part, as will be discussed in more detail later (N.B. "entry" in this sense is now being used to refer to a point of entering the list, as opposed to a list entry 512). E.g. the entry point field may mark which entry is the head (e.g. an IsHead flag) or which is the tail (e.g. IsTail) However this is not essential and in alternative embodiments the entry point could be predetermined (e.g. always the head) or determined in some other way.

Optionally, each entry in the linked-list RAM 112 may further comprise a respective priority field 519 mapped to the respective ray ID. These will be discussed in more detail later.

At step 330 the task builder 330 adds the new ray to the determined task for that ray, whether that be by starting a new linked-list for the new ray in the linked-list RAM 112 (if the new ray is to be processed by a shader ID for which there is no existing task), or by adding the new ray to an existing linked list for an existing task in the linked-list RAM 112 (if the new ray is to be processed by a shader ID for which an existing task has already been started but not yet scheduled). When starting a new list, the first ray to be included in the list is initially both the head and the tail of the list (and occasionally some tasks may only ever comprise one ray before they are scheduled). When adding to an existing list, then depending on implementation, the new ray may be added to either the head or the tail of the list. In particular embodiments it is added to the head.

At step 340 the task builder 106 determines whether a task is ready for scheduling. In embodiments the task builder 106 comprises a cache 114, which may be referred to as the task cache. A cache employed here provides a fast way to check whether a task already exists for a new ray, and in addition the cache eviction policy provides a convenient basis for determining when tasks are ready for scheduling.

An example of the task cache 114 is shown in FIG. 5c. The cache 114 comprises a plurality of bins 522 (i.e. cache entries, or "cachelines"). Each bin 522 comprises at least one of a head pointer field 526h and a tail pointer field 526t, mapped to a respective bin number 524. These are for recording a head pointer and a tail pointer of the linked list of a respective task. This provides an indication of a respective linked list in the linked-list RAM 112. Thus each bin 522 can cache an indication of a different respective one of the tasks. In embodiments each bin 522 may comprise both a head and a tail pointer 526h, 526t. In embodiments there is a many-to-one mapping between shader IDs and cache bins 522. When the task builder 106 receives an indication of a shader ID for a new ray from the logic 501 in the ray store 110 (or in alternative implementations when shader ID derivation logic implemented in the task builder 106 itself does this), then the task builder 106 performs a many-to-one transformation on the shader ID, such as hash on the shader ID. The output of this transformation specifies one or more cache bins 522 for caching any task that is to be processed by the shader ID in question. Depending on implementation, this could be a specific bin or a subset of possible bins for the task. If a new task is to be created for an incoming ray, and one of these one or more bins is unoccupied (not already used to cache a task), then the unoccupied bin is used to cache the indication of the new task (by recording an indication of the head and/or tail of the new linked list for that task). If on the other hand all of the one or more bins mapped to the shader ID for the new task are already occupied, then another, existing task has to be evicted from one of these bins in order to make space for the new task to be cached there. The existing, evicted task is declared as ready for scheduling on the basis of being evicted from the cache.

Note: in embodiments where a new ray is added to the head of the list and the head pointer is recorded in the cache 114, then the task builder will need to update the head pointer 526h in the cache 114 each time a new ray is added to an existing task. Similarly if new rays are added to the tail and the tail pointer is recorded in the cache 114, then the task builder 106 will need to update the tail pointer 526t each time a new ray is added to an existing task. If only the head pointer is recorded in the task cache 114 and new rays are added to the tail of the respective task, or vice versa, then the pointer in the cache will not need to be updated each time. However in some embodiments it may be desirable to hold both the head and tail pointer in the cache, such as to aid with patching or stitching (see optional addenda discussed later).

FIG. 6 illustrates one example implementation of the task cache 114. Here the cache 114 is arranged into sets and ways. The ways are the bins 522 mentioned previously, and each set 602 comprises a respective subset of one or more of the bins. Four ways per set are shown in FIG. 6 by way of illustration, but it will be appreciated that this is not limiting.

When the task builder 106 receives a shader ID from the ray store logic 501 (or derives the shader ID itself, depending on implementation), then the task builder 106 performs a many-to-one transformation such as a hash on the shader ID. The output of this hash gives one of the sets 602. The task builder 106 also determines a tag for the shader ID, which distinguishes amongst the different possible shader IDs which map to the same way. This is recorded as an additional field in each occupied way (cache bin). As mentioned previously, in some embodiments the tag may be generated in dependence on the shader ID and additional information such as shader type, and/or which of multiple SIMD engines generated the primary ray.

For each new ray received into the ray store 110, the task builder 106 determines whether a cache entry for the shader ID for that ray already exists. It does this based on the set number and tag, which between them uniquely map to a shader ID. If so, the task builder adds this ray to the task (i.e. batch of rays) to be processed by the shader with that shader ID. If not however, the task builder 106 will need to create a new task in the linked-list RAM 112 and find a new way for caching this new task in the cache 114. To do this, it checks the many-to-one transform (e.g. hash) of the shader ID to find the set 602 for that shader ID. If all the ways 522 in that set 602 are not already occupied, the task builder 106 simply adds the new task to one of the unoccupied bins. However, if all the ways 522 in the set 602 mapped to the shader ID in question are already occupied by other tasks, then the task builder 106 will evict one of the existing tasks in order to accommodate the new task. The evicted task is then deemed ready for scheduling on the basis of this. Depending on implementation, the longest or shortest way in the set will be chosen for eviction after a collision, or the oldest or least-recently used way.

In some embodiments, there may be a maximum task length (where the length of a task is the number of items in its linked list), which may be based on the SIMD width of the processor. In this case there are two options for dealing with this. The first is that the task builder 106 tracks the length of each task, and then starts a new task if it reaches the maximum task length. The second, alternative approach is that the builder 106 does not record the length of the tasks, but then in the scheduler 108, if a selected task is longer than the SIMD length, it splits the task during scheduling. To implement the first scheme, the hardware maintains a counter per cache entry. For the second scheme, a single counter can be used on the selected task to be scheduled. The second option is cheaper to implement, but there are potentially performance advantages of the former approach.

If, after adding a new ray to a task in the linked-list RAM 112, no tasks are ready for scheduling, then the method loops back to step 310 where the task builder 106 continues to wait to detect further new rays being received into the ray store 110. If however a task is ready for scheduling, e.g. because it has been evicted from the task cache 114, then the task builder 106 proceeds to step 350 where it flags the task as ready for scheduling in the linked-list RAM 112. This may also be described herein as closing the task (the task is said to be closed). In embodiments this is done by asserting the flag 516 of the list entry of one of the rays in the linked list. E.g. in embodiments this may be the entry at the head (flagged with the IsHead flag) or the tail of the list (flagged with the IsTail flag), depending on implementation. The method then loops back to step 310 where the task builder 106 continues to wait to detect further new rays being received into the ray store 110.

The above is just one possible mechanism that could be used to check whether there is an existing task corresponding to the shader ID of a new ray. For example, more generally a similar functionality could be achieved using any temporary storage arranged to store one or more indications of tasks being built, where the task builder 106 removes the indication of a selected task from the temporary storage based on one or more predetermined criteria and indicates that the selected task is ready for scheduling when the indication is removed from the temporary storage. Or the task builder 106 could instead simply maintain a table of shader IDs that already have tasks in the linked-list RAM 112, or could record this in the linked-list RAM 112 itself and look-up whether a task exists each time a new ray is received. However these approaches will be less efficient in terms of speed and/or silicon.

The arrangement of FIG. 6 is a particularly advantageous implementation since the many-to-one mapping allows to accommodate X possible shader IDs in Y ways where $X \gg Y$. One could use a buffer with a 1-to-1 mapping but that would require a storage that can accommodate X shader IDs which would be very expensive with respect to silicon.

Another alternative would be to perform the mapping using a hash from 'shader ID' to 'cache line', but this would be harder to guarantee only unique mappings will be used (even if a cacheline is maintained for each ray in ray store). Another alternative would be reading one sub-set of cache line entry per cycle over multiple cycles (with a state machine searching all entries), but this would limit the rate at which input rays can be processed. Another alternative would be to search the cache for a shader ID matching that of a new ray by performing a comparison with every cached shader ID in parallel. However, this approach means that a RAM can't be used to store the cached shader IDs (if it is required to read from all addresses in the same cycle), and to use flip-flops for that storage, in addition to the required parallel comparison logic would be very expensive in silicon area. Another alternative would be to use a hash to map to one set, but with only one way, there is a risk that a series of rays alternate between 2 shader IDs which happen to map to the same set, and so one set would be thrashed whilst all the other sets remain unused.

By using a combination of a hash to a set, but then a plurality of ways (e.g. 4) per set, means one can store the 4 ways in parallel fields of the same RAM entry, and then perform 4 parallel comparisons to detect a hit. This attempts to limit area cost associated with parallel comparisons, but good performance of the cache does then rely to some extent on the mapping function used, and the statistical distribution of the sequence of shader IDs associated with new rays. For example, the mapping should be performed using a hash that is chosen such that typical sequences of shader IDs are distributed reasonably across all the sets of the cache. Should a sequence of shader IDs map predominantly to the same set this may cause 'thrashing' of the cache (where 'thrashing' refers to repeated evictions of a cache line which very shortly afterwards needs to be re-allocated), and consequently, may result in tasks being scheduled that contain fewer items (e.g. rays) than might otherwise be possible.

In some embodiments, tasks or ways that become full simply stay in the cache until a new ray maps onto them, in which case they get evicted. However, in some further embodiments, alternative or additional cache eviction policies may be employed by the cache 114 to determine when to close a task. To this end, each cache bin (or way) may comprise one or more additional fields. These may comprise for example an age field 528 which records an indication of the time at which the respective task was added to the cache, and/or a length field which records the length of the task in number of rays. Another alternative or additional example is a priority field 529 which records a priority level associated with the respective task. In embodiments, the cache eviction policy employed by the cache 114 may additionally evict any task (irrespective of whether it needs to be evicted to make space for a new task) in response to detecting that it exceeds a predetermined threshold age or length according to the respective field 528, and/or may evict tasks randomly. And/or, where it is required to select between the tasks in multiple different ways of a given set to make space for a new task, the policy may comprise evicting the task amongst those in the set that has the oldest age or longest length according to the respective field 528 in the cache 114, or selecting a task randomly for eviction from amongst the set. As another example, the task selected for eviction amongst the set may comprise that with the highest priority level (most in need of scheduling) according to the respective priority field 519. For instance, a task containing a ray that is throttling the pipeline by not being scheduled, or causing a deadlock, may be assigned a high priority.

The cache 114 is also not limited to the sets-and-ways arrangement of FIG. 6. Another example of a possible cache-based mechanism would be that any task can be cached in any bin of the task cache 114, and an existing task is evicted only when the whole cache is full and any bin 522 could be evicted to accommodate a new task.

An alternative or additional approach to determine whether a task is ready for scheduling, without necessarily using a cache 114, would be simply to determine a task as ready once a certain threshold time has elapsed since the task's creation, and/or once the task has exceeded a predetermined threshold number of rays in length. Another example would be to randomly declare tasks as ready for scheduling. A combination of approaches could also be used. E.g. an existing task may be evicted either to accommodate a new task or when it has exceeded a certain threshold age or length.

In embodiments the tasks scheduler 108 may comprise a "walking evictor", which kicks in whenever the task scheduler runs low on available work. This mechanism will scan through the cache 114 trying to find ways that contain the type of tasks the scheduler is starved of. The walking evictor is a background process that runs periodically to forcefully push work from builder to scheduler. The basis for selecting which to evict could comprise any of the factors discussed above or others, e.g. priority, age, length, or randomness.

Figure 4:
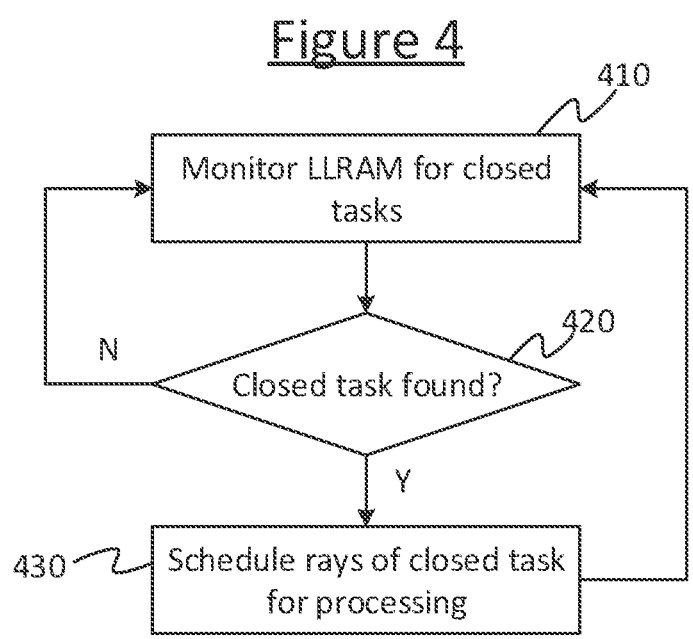
FIG. 4 is a flow chart of a method performed by a task scheduler according to embodiments of the present disclosure.

FIG. 4 shows the method of the task scheduler 108. At step 410 the task scheduler 108 monitors the linked-list RAM 112 for any linked-lists which are marked as closed (i.e. the task represented by that linked list is ready for scheduling). In embodiments, this comprises monitoring for any list entry 512 in which the valid flag (IsValid) 516 is asserted. In certain embodiments this is also the list entry which is to be the entry point (flagged with IsHead or IsTail, depending on implementation) for walking the list. This may be indicated by a separate entry point marker field 518, as mentioned previously. In alternative embodiments the valid flag 516 and entry point marker could be the same field (i.e. the entry flagged with the valid flag is automatically used by the task scheduler 108 as the entry point for the list). In other embodiments, each list entry 512 may comprise both an IsHead and IsTail field such that both the head and the tail of any given list are marked in the linked list RAM 112.

The monitoring may comprise scanning for rays with IsValid=1 and IsHead=1 (or IsValid=1 and IsTail=1). This is fast because it only requires scanning through a bit vector of length equal to the number of rays, where each bit is the Boolean AND of the IsValid and IsHead flags (or IsValid=1 and IsTail=1).

At step 420, if no closed (i.e. ready) task is found, the method loops back to step 410 where the task scheduler 410 continues monitoring for closed tasks. When a closed task is found however, the tasks scheduler 108 proceeds to step 430 where it schedules the rays of the closed task for processing by the parallel processing (e.g. SIMD) subsystem 102.

To do this, the task scheduler 108 walks the linked list, in embodiments starting from the entry flagged with the entry point marker 518. E.g. if the entry point marker 518 marks which entry holds the head of the linked list, the task scheduler may start walking the list from the head (following the next-ray pointer field of the head to the next ray in the list, then following the next-ray pointer field of that ray's list entry to the next ray, and so forth). Or if the entry point marker 518 marks which is the tail of the list (in embodiments where the tail's next-ray pointer points back to the head), then the task scheduler 108 may read the next-ray pointer of the tail to find the ray ID of the head, then start walking the list from the head (or simply start walking the list from the tail).

For each ray that the task scheduler 108 encounters on its walk through the closed list, it supplies the ray ID of that ray to the parallel processing subsystem 102. The ray ID may be supplied in raw or transformed form. E.g. in some embodiments the scheduler 108 may pack all the information needed to start a task 102 including the rays and then send that to the parallel processing subsystem 102 (i.e. the scheduler 108 does not actually pass the ray IDs in raw (untransformed) form. However in other embodiments the task scheduler 108 may pass the ray IDs in raw (untransformed) form.

The task scheduler 108 also receives the shader ID from the ray store 110 and supplies it to the processing subsystem 102. In an alternative variant the processing subsystem 102 could read or receive the shader IDs directly from the ray store 110 or some other element of the system. Either way, the shader ID points to a program in memory 104, and each of the supplied ray IDs points to a ray description in the ray store 110, both of which the processing subsystem 102 has access to. The processing subsystem thus runs the shader program pointed to by the supplied shader ID, operating in parallel on the ray descriptions from the ray store 110 corresponding to the supplied ray IDs.

In further embodiments, the entry for each ray in the linked-list RAM 112 may further comprise a respective priority field for recording a priority level associated with the respective ray or its task. Depending on implementation, the priority field may be populated for only one representative ray in the list, e.g. the head, tail or entry point, thus being set on a per list (per task) basis; or alternatively it may be populated on a per ray basis. In some implementations the priority may be set on a per task basis and may be copied from the priority field for the rays' task in the cache 114. The task scheduler 106 may take into account the priority level in the linked-list RAM 112 when determining which tasks or rays to schedule. For instance if a ray or task has a certain priority level, e.g. indicating that the ray or task is causing a deadlock in the pipeline or throttling the pipeline, then the task scheduler 108 may select to schedule the task or individual ray before the respective task is marked ready by the task builder 106 (in some such embodiments these deadlock rays may bypass the task builder 106 and linked-list RAM 112 and go directly to the scheduler 108 to be dispatched alone in a task, i.e. one instance valid for the task). As another example implementation, if two or more tasks become ready within a short space of time, the task scheduler 108 may schedule them in order of priority level (highest priority first).

Figure 7A:
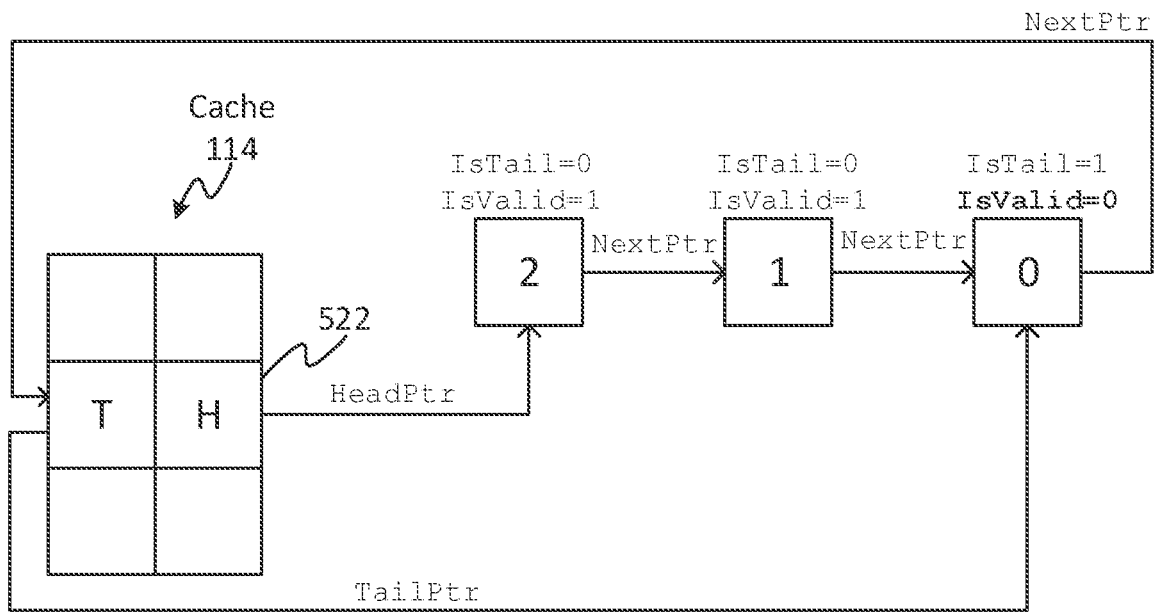
FIG. 7a-7b schematically illustrate a linked-list being build and then closed.

FIG. 7*a* shows an example of a linked-list while it's being built.

When the task builder 108 creates a new linked-list it sets a new bin's tail pointer 526*t* (TailPtr) and head pointer 526*h* (HeadPtr) to the ray ID of the incoming ray. It then clears the ray's tail marker (IsTail), which in this example is the entry point marker 518, and also updates the tail ray's next ray pointer 514 (NextPtr), but not to reference itself as is sometimes done with the tail of a linked list. Instead the NextPtr is made to point to the actual bin 522 in the cache 114 with an identifier which is a concatenation of the set and way numbers. This is an optional feature, discussed in more detail shortly (see the "first addendum").

When a ray arrives and hits on a bin 522, the task builder 106 accumulates its ray ID 502 in the linked-list by updating the head pointer 526*h* (HeadPtr) pointer of the bin and the next-ray pointer 514 (NextPtr) of the ray. Whenever a new ray is added to a task, the task builder 106 asserts the valid flag ("IsValid") 516 against the entry for the respective ray in the linked-list RAM 112, which denotes that the ray is now part of a linked-list. The incoming ray's NextPtr is made to point to the old head ray and the bin's new HeadPtr now points to the incoming ray.

Figure 7B:
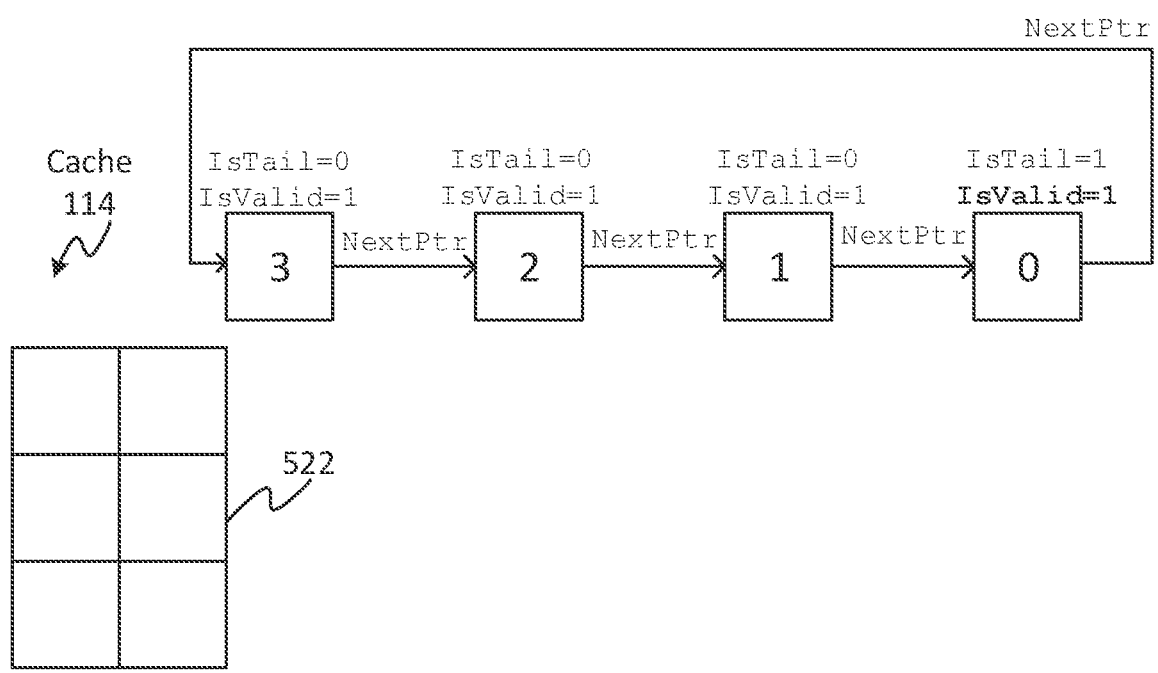

FIG. 7*b* shows the linked-list after it has been "closed" due to its bin 522 having been evicted.

When closing a linked-list, the task builder 106 updates the valid flag of the tail, and also the next ray pointer 514 ("NextPtr") of the tail so as to point back to the head. The task scheduler 108 only considers linked lists that are ready and have a tail ray with the valid flag 512 asserted. Once a linked-list is selected the task scheduler 108 starts immediately by reading the NextPtr pointer of its tail ray.

At the time when the cache 114 evicts a bin 522, the task builder 106 closes its linked-list by updating the NextPtr of its tail ray (oldest) to point to the head ray (newest). This way it has created a circular linked-list that can be read in its entirety starting from any ray within it. To differentiate between a tail ray pointing to the cache bin or the head ray, its IsValid flag is used, being set when the task builder 106 closes the linked-list. Notice that the tail ray now points back to the head, and the bin no longer holds references to the linked-list. Also the tail ray's isValid is now 1.

In some embodiments, optionally the disclosed logic 101 may employ one or more additional features referred to herein as "addenda".

In a first optional addendum. The task scheduler 108 can effect a cacheline eviction using information stored in the terminal ray of a linked-list. To wit an uncompleted linked-list can be signalled for termination by the scheduler 108. To effect this, the last entry in the list of a given task points back to the cache bin 522 of that same task in the cache 114. In this way, if the consumer is working faster than the producer and is totally starved, it can request the bin to be evicted, and therefore its task closed, in order to feed it with new work, before the task is flagged as ready by the task builder 106. The tail of the task points back to its own cache bin 522 until it is marked ready. Thus the task scheduler 108 can force it (i.e. the bin attached to the incomplete linked-list) to be flushed, and as such close the linked-list so the starved downstream processor can consume it. The task will just be forced to "close" and then it will just find its way down the pipeline to the scheduler (as usual). This is better than just signalling that it is starved and letting the producer (task builder 106) choose which bin to evict, because the consumer may know what type of work it has capacity to do or would prefer to do, e.g. if there are different priorities of work.

In a second optional addendum, the task scheduler 108 can choose to partially read out a contiguous section of a completed linked-list while maintaining its structural integrity by patching it for subsequent accesses. I.e. if the list grows long, e.g. 100 rays, but the scheduler 108 or processing subsystem 102 can only handle, say, 64 rays at a time, then the scheduler can chop up the list by scheduling only a top portion of the list and marking a remaining ray in the middle as a new head (or scheduling only a bottom portion of the list and marking a remaining ray in the middle as the new tail).

In a third optional addendum, the task scheduler can read out a single ray from anywhere in the linked-list while maintaining its structural integrity by patching it for subsequent accesses. Normally the scheduler 108 walks the linked-list RAM 112 to look for any that are flagged closed. However in this addendum, the scheduler 108 can choose to query a particular ray ID ("ray no. X") or extract a particular ray for scheduling. To facilitate this the tail points back to the head so the scheduler can read the whole list without necessarily having to start from the head. This is useful if the task scheduler 108 does not necessarily know where the head is, e.g. because a head marker is not included in the linked-list RAM 112, as in the example of FIG. 5*b*, and the tail does not (or at least not yet) point back to the head.

In a fourth optional addendum, completed linked-lists can be stitched together in meta linked-lists based on priority or other criteria. This may be done by the task builder 106 This means that when scheduling, the scheduler 108 doesn't need to scan to find the next linked-list, but just keeps following the meta linked list. Ray flags can be used to delineate individual linked-lists. In some implementations of this, individual linked-lists cannot be randomly accessed since we only maintain entry-points in meta linked-lists. That said ray flags can be used to delineate individual linked-lists.

Figure 8:
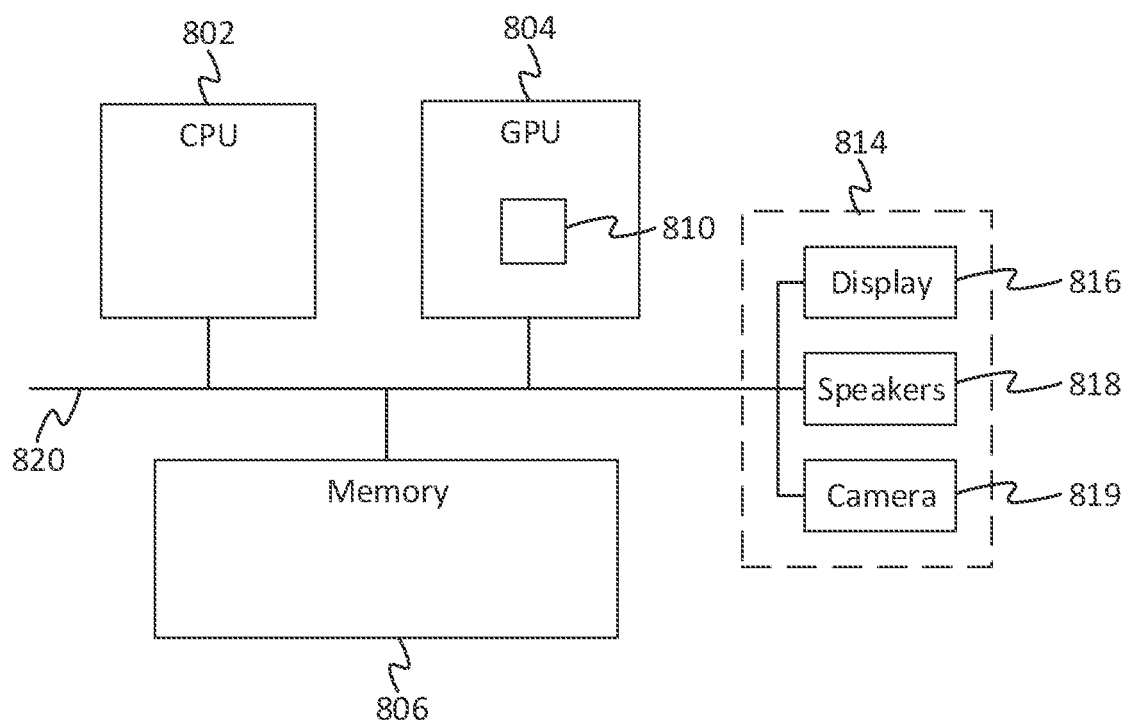
FIG. 8 is a schematic block diagram of a computer system in which a graphics processing system is implemented.

FIG. 8 shows a computer system in which the graphics processing systems described herein may be implemented. The computer system comprises a CPU 802, a GPU 804, a memory 806 and other devices 814, such as a display 816, speakers 818 and a camera 819. A processing block 810 (corresponding to the processing subsystem 102 in FIG. 1) is implemented on the GPU 804. In other examples, the processing block 810 may be implemented on the CPU 802. The components of the computer system can communicate with each other via a communications bus 820. A store 812 (which may correspond, at least in part, to memory 104 in FIG. 1) is implemented as part of the memory 806.

The logic of FIGS. 1 to 7 is shown as comprising a number of functional blocks. This is schematic only and is not intended to define a strict division between different logic elements of such entities. Each functional block may be provided in any suitable manner. It is to be understood that intermediate values described herein as being formed by the logic need not be physically generated by the logic at any point and may merely represent logical values which conveniently describe the processing performed by the logic between its input and output.

The logic described herein may be embodied in hardware on an integrated circuit. The logic described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture logic configured to perform any of the methods described herein, or to manufacture a logic comprising any apparatus described herein. An integrated circuit definition dataset may be, for example, an integrated circuit description.

Therefore, there may be provided a method of manufacturing, at an integrated circuit manufacturing system, logic as described herein. Furthermore, there may be provided an integrated circuit definition dataset that, when processed in an integrated circuit manufacturing system, causes the method of manufacturing the logic to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture the logic will now be described with respect to FIG. 9.

Figure 9:
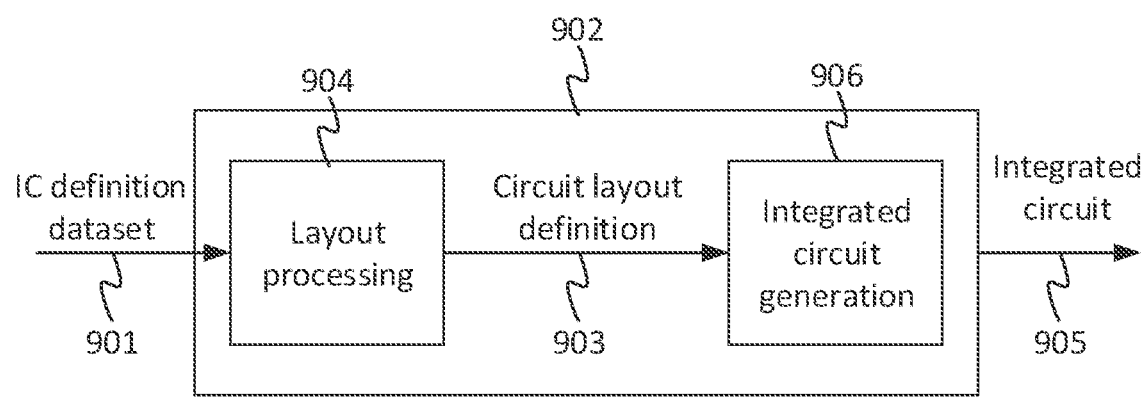
FIG. 9 is a schematic block diagram of an integrated circuit manufacturing system for generating an integrated circuit embodying a graphics processing system.

FIG. 9 shows an example of an integrated circuit (IC) manufacturing system 902 which is configured to manufacture logic as described in any of the examples herein. In particular, the IC manufacturing system 902 comprises a layout processing system 904 and an integrated circuit generation system 906. The IC manufacturing system 902 is configured to receive an IC definition dataset (e.g. defining logic as described in any of the examples herein), process the IC definition dataset, and generate an IC according to the IC definition dataset (e.g. which embodies logic as described in any of the examples herein). The processing of the IC definition dataset configures the IC manufacturing system 902 to manufacture an integrated circuit embodying logic as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 1006. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture logic without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

According to one aspect disclosed herein, there is provided logic as set out in the Summary section.

In embodiments, the eviction policy may comprise: when a new task is created and a set of bins suitable for caching the new task is full, an existing task is evicted from one of the bins of the set to accommodate the new task.

In embodiments, the cache may be arranged into sets and ways, each set comprising one or more of the ways, and the ways being the bins, wherein each set is mapped to a subset of the tasks, and the cache is configured so as when a new task is created, the new task is added to one of the ways of the set mapped to the new task; and said eviction policy may comprise: when a new task is created and all the ways of the set mapped to the new task are full, an existing task is evicted from one of the ways of this set in order to accommodate the new task.

In embodiments, each task may have an associated priority recorded in the cache, being indicative of a priority for scheduling the respective task, and the existing task selected for eviction may be that with the highest priority for scheduling amongst the set.

Alternatively, in embodiments the existing task selected for eviction may be that with the largest number of data items in the in the respective linked list.

As another possibility, each task may have an associated age recorded in the cached, being indicative of a time since the task was created, and the existing task selected for eviction may be that with the oldest age.

Alternatively or additionally, in embodiments each task may have an associated age recorded in the cache, being indicative of a time since the task was created, and the eviction policy may comprise: evicting task if the age exceeds a threshold.

Alternatively or additionally, in embodiments the eviction policy may comprise:

evicting a task if the respective linked list exceeds a threshold number of data items in length.

Alternatively or additionally, in embodiments the eviction policy may comprise evicting tasks randomly.

In embodiments, the indication of each task in the cache may comprise a pointer to the item ID of the head and/or tail data item in the respective linked list.

In embodiments, each entry in the linked-list RAM may further comprise an entry point marker, wherein the task builder may be configured, for each task ready for scheduling, to assert one of the entry point markers to indicate which data item in the linked list is to act as an entry point to the list; and the task scheduler may be configured so as, when following the pointers of the respective linked-list to perform said scheduling, to start from the data item in the entry with the entry point marker asserted.

In embodiments the entry for the tail data item in each linked list may record a pointer to itself or comprises a null value.

Alternatively, the entry for tail data item in each linked list records a pointer to the head data item of the respective linked list. In some such embodiments, the task scheduler may be operable to schedule any selected individual one of the data items for processing from one of the linked lists, and to stitch together a remainder of that linked list for future scheduling, by setting the pointer of an adjacent entry preceding that of the individual data item to point to the data item of an adjacent entry following that of the individual data item.

In embodiments, the task builder may be operable to set the entry for the tail data item the linked list of at least one of the tasks to point to the cache bin of the respective task in the cache; and wherein task scheduler is configured so as, if starved of work, to schedule the respective task from the cache bin pointed to by the tail before indicated as ready by the task builder.

In embodiments, the task scheduler is operable to schedule only a contiguous subgroup of the data items from the beginning or end of one of the tasks, and to leave the remainder of the task for future scheduling by making one of the remaining data items the new head or tail item, respectively.

In embodiments, the task builder may be operable to patch together two tasks setting the pointer in the entry of the tail data item in one of the two respective linked lists to point to the head data item of the other, thus creating a meta linked list, and may be configured to schedule the data items of the two tasks by following the pointers from one list in the meta linked list to the next.

In embodiments, each data item may represent a graphical element.

For example each graphical element may be a ray of a ray tracing application, and the data content of each data item may comprise a ray description.

In some such embodiments each respective program may be a shader program for processing the rays of the respective task.

In embodiments the task builder and task scheduler may be implemented in fixed function hardware circuitry.

According to another aspect disclosed herein there may be provided a processor comprising: the logic of any embodiment, and the parallel processing subsystem.

In embodiments the processor may take the form of an accelerator processor for acting as an accelerator to a host, being configured to receive the data items from the host.

In embodiments the logic or processor may be embodied in hardware on an integrated circuit.

According to another aspect, there is provided a method of manufacturing, using an integrated circuit manufacturing system, the logic or processor of any embodiment disclosed herein.

According to another aspect, there is provided an integrated circuit definition dataset that, when processed in an integrated circuit manufacturing system, configures the integrated circuit manufacturing system to manufacture the logic or processor of any embodiment disclosed herein.

According to another aspect there is provided an integrated circuit manufacturing system configured to manufacture the logic or processor of any embodiment disclosed herein.

According to another aspect disclosed herein, there is provided a method comprising: building a plurality of tasks, each comprising a respective group of data items to be processed by a respective program; scheduling each of the tasks to be processed by the respective program run on a parallel processing subsystem, whereby for each task, at least some of the data items of the respective group are processed in parallel; holding in a data store, at least temporarily, respective data content of each of the data items mapped to a respective item ID; and maintaining a linked-list RAM comprising a respective entry for each of the item IDs. The building of the tasks is performed by: when a new data item is received into the data store, determining whether an existing task exists for the new data item, and a) if not creating a new task by starting a new respective linked list in the linked-list RAM comprising the new data item, but b) if so, adding the new data item to an existing respective linked list in the linked-list RAM, wherein in each linked list, the entry for each data item in the list from a head data item to at least a last before a tail data item records a pointer to a next item ID in the linked list. The task building further comprises indicating when any of the tasks is ready for scheduling. The scheduling comprises, based on said indication from the building, identifying a task ready for scheduling, and in response following the pointers in the respective linked list in order to schedule the data items of the respective task for the processing by the parallel processing subsystem.

In embodiments the method may comprise steps corresponding to the operations of any embodiment of the logic or processor disclosed herein.

According to another aspect there may be provided a graphics processing system configured to perform the method.

According to another aspect there is provided computer readable code configured to cause the method to be performed when the code is run.

According to another aspect there is provided a computer readable storage medium having encoded thereon the above-mentioned computer readable code.

According to further aspects disclosed herein, there may be provided a corresponding method of operating the logic or processor, and a corresponding computer program configured to operate the logic or processor. According to yet further aspects there may be provided a corresponding method of manufacturing the logic or processor, a corresponding manufacturing facility arranged to manufacture the logic or processor, and a corresponding circuit design data set embodied on computer-readable storage.

For instance according to one aspect there may be provided a non-transitory computer readable storage medium having stored thereon a computer readable description of the logic or processor of any embodiment herein which, when processed in an integrated circuit manufacturing system, causes the integrated circuit manufacturing system to: process, using a layout processing system, the computer readable description of the logic or processor so as to generate a circuit layout description of an integrated circuit embodying said logic or processor; and manufacture, using an integrated circuit generation system, the logic or processor according to the circuit layout description.

According to another aspect, there may be provided an integrated circuit manufacturing system comprising: a non-transitory computer readable storage medium having stored thereon a computer readable description of the logic or processor of any embodiment disclosed herein; a layout processing system configured to process the computer readable description so as to generate a circuit layout description of an integrated circuit embodying said logic or processor; and an integrated circuit generation system configured to manufacture the logic or processor according to the circuit layout description.

According to another aspect there may be provided a method of manufacturing, using an integrated circuit manufacturing system, the logic or processor of any embodiment disclosed herein, the method comprising: processing, using a layout processing system, a computer readable description of said circuit so as to generate a circuit layout description of an integrated circuit embodying the logic or processor; and manufacturing, using an integrated circuit generation system, the logic or processor according to the circuit layout description.

According to another aspect there may be provided a layout processing system configured to determine positional information for logical components of a circuit derived from the integrated circuit description so as to generate a circuit layout description of an integrated circuit embodying the logic or processor of any embodiment disclosed herein.

Other variants, implementations and/or applications of the disclosed techniques may become apparent to a person skilled in the art once given the disclosure herein. The scope of the present disclosure is not limited by the above-described embodiments but only by the claims.

What is claimed is:

1. Logic embodied on an integrated circuit, the logic comprising:
    a task builder for building a plurality of tasks, each comprising a respective group of data items;
    a task scheduler for scheduling each of the tasks to be processed, whereby for each task, at least some of the data items of the respective group are processed in parallel;
    a data store arranged to hold respective data content for each of the data items; and
    a linked-list memory comprising a respective entry for each of the data items;
    wherein the task builder is configured to, when a new data item is received into the data store, determine whether an existing task exists for the new data item, and if so add the new data item to an existing respective linked list in the linked-list memory;
    wherein the task builder is further configured to indicate when any of the tasks is ready for scheduling; and
    wherein the task scheduler is arranged to identify a task ready for scheduling based on the indication from the task builder, and in response to traverse the respective linked list in order to schedule the data items of the respective task for the processing.

2. The logic of claim 1, wherein the task builder is configured to perform said indicating by asserting a respective flag in the linked-list memory to flag when any of the tasks is ready for scheduling; and
    wherein the task scheduler is arranged to perform said identifying by monitoring the linked-list memory for asserted flags, and to detect that one of the tasks is ready when the respective flag is asserted.

3. The logic of claim 1, wherein the task builder comprises temporary storage arranged to store one or more indications of tasks being built, and the task builder is configured to remove the indication of a selected task from the temporary storage based on one or more predetermined criteria and indicate that the selected task is ready for scheduling.

4. The logic of claim 3, wherein the temporary storage comprises a cache comprising a plurality of bins, each operable to cache one of the tasks by temporarily recording an indication of the task, wherein when a new task is created it is cached in one of the bins, wherein the one or more predetermined criteria comprise an eviction policy and the cache is configured to evict tasks from the bins according to the eviction policy, and wherein the task builder is configured to indicate that the selected task is ready for scheduling when the selected task is evicted from the cache.

5. The logic of claim 4, wherein the eviction policy comprises: when a new task is created and a set of bins suitable for caching the new task is full, an existing task is evicted from one of the bins of the set to accommodate the new task.

6. The logic of claim 5, wherein:
    the cache is arranged into sets and ways, each set comprising one or more of the ways, and the ways being the bins, wherein each set is mapped to a subset of the tasks, and the cache is configured so as when a new task is created, the new task is added to one of the ways of the set mapped to the new task; and
    wherein said eviction policy comprises: when a new task is created and all the ways of the set mapped to the new task are full, an existing task is evicted from one of the ways of this set in order to accommodate the new task.

7. The logic of claim 5, wherein either:
    (i) each task has an associated priority recorded in the cache, being indicative of a priority for scheduling the respective task, and wherein the existing task selected for eviction is that with the highest priority for scheduling amongst the set; or
    (ii) the existing task selected for eviction is that with the largest number of data items in the in the respective linked list; or
    (iii) each task has an associated age recorded in the cached, being indicative of a time since the task was created, and the existing task selected for eviction is that with the oldest age.

8. The logic of claim 4, wherein:
    (i) each task has an associated age recorded in the cache, being indicative of a time since the task was created, and wherein the eviction policy comprises: evicting task if the age exceeds a threshold; and/or
    (ii) the eviction policy comprises: evicting a task if the respective linked list exceeds a threshold number of data items in length; and/or
    (iii) the eviction policy comprises evicting tasks randomly.

9. The logic of claim 3, wherein the indication of each task in the cache comprises a pointer to an item ID of a head and/or tail data item in the respective linked list.

10. The logic of claim 1, wherein each entry in the linked-list memory further comprises an entry point marker, wherein the task builder is configured, for each task ready for scheduling, to assert one of the entry point markers to indicate which data item in the linked list is to act as an entry point to the list; and the task scheduler is configured so as, traversing the respective linked-list to perform said scheduling, to start from the data item in the entry with the entry point marker asserted.

11. The logic of claim 1, wherein:
    the entry for a tail data item in each linked list records a pointer to a head data item of the respective linked list; and
    the task scheduler is operable to schedule any selected individual one of the data items for processing from one of the linked lists, and to stitch together a remainder of that linked list for future scheduling, by setting the pointer of an adjacent entry preceding that of the individual data item to point to the data item of an adjacent entry following that of the individual data item.

12. The logic of claim 4, wherein the task builder is operable to set the entry for a tail data item in the linked list of at least one of the tasks to point to the cache bin of the respective task in the cache; and wherein task scheduler is configured so as, if starved of work, to schedule the respective task from the cache bin pointed to by the tail data item before indicated as ready by the task builder.

13. The logic of claim 1, wherein the task scheduler is operable to schedule only a contiguous subgroup of the data items from the beginning or end of one of the tasks, and to leave the remainder of the task for future scheduling by making one of the remaining data items the new head or tail item, respectively.

14. A method comprising:
building a plurality of tasks, each comprising a respective group of data items to be processed;
scheduling each of the tasks to be processed, whereby for each task, at least some of the data items of the respective group are processed in parallel;
holding, in a data store, respective data content of each data item; and
maintaining a linked-list memory comprising a respective entry for each of the data items;
wherein the building of the tasks comprises: when a new data item is received into the data store, determining whether an existing task exists for the new data item, and if so adding the new data item to an existing respective linked list in the linked-list memory;
the building of the tasks further comprises indicating when any of the tasks is ready for scheduling; and
the scheduling comprises, based on said indication from the building, identifying a task ready for scheduling, and in response traversing the respective linked list in order to schedule the data items of the respective task for the processing.

15. A non-transitory computer readable storage medium having stored thereon a computer readable dataset description of the logic as set forth in claim 1 that, when processed in an integrated circuit manufacturing system, causes the integrated circuit manufacturing system to manufacture an integrated circuit embodying the logic.

16. A method of manufacturing an integrated circuit embodying the logic as set forth in claim 1 using an integrated circuit manufacturing system, comprising inputting a computer readable dataset description of the logic as set forth in claim 1 into said integrated circuit manufacturing system, and causing the integrated circuit manufacturing system to manufacture an integrated circuit embodying the logic.

17. An integrated circuit manufacturing system configured to manufacture an integrated circuit embodying the logic as set forth claim 1.

18. A graphics processing system configured to perform the method as set forth in claim 14.

19. A non-transitory computer readable storage medium having stored thereon computer readable code configured to, when the code is run, cause a method to be performed comprising:
building a plurality of tasks, each comprising a respective group of data items to be processed;
scheduling each of the tasks to be processed, whereby for each task, at least some of the data items of the respective group are processed in parallel;
holding, in a data store, respective data content of each data item; and
maintaining a linked-list memory comprising a respective entry for each of the data items;
wherein the building of the tasks comprises: when a new data item is received into the data store, determining whether an existing task exists for the new data item, and if so adding the new data item to an existing respective linked list in the linked-list memory;
the building of the tasks further comprises indicating when any of the tasks is ready for scheduling; and
the scheduling comprises, based on said indication from the building, identifying a task ready for scheduling, and in response traversing the respective linked list in order to schedule the data items of the respective task for the processing.

* * * * *